United States Patent [19]

Nold

[11] Patent Number: 4,712,029
[45] Date of Patent: Dec. 8, 1987

[54] GENERATOR HIGH TEMPERATURE ELECTRICAL LEAD ASSEMBLY

[75] Inventor: Robert D. Nold, Rockford, Ill.

[73] Assignee: Sundstrand Corporation, Rockford, Ill.

[21] Appl. No.: 945,033

[22] Filed: Dec. 22, 1986

[51] Int. Cl.[4] .......................... H02K 5/10; H02K 9/00; H01B 17/30
[52] U.S. Cl. .................................. 310/71; 174/15 BH; 174/18; 310/54; 439/485
[58] Field of Search ............... 174/15 BH, 16 BH, 18; 310/54, 71, 87, 89, 45; 339/94 A, 112

[56] References Cited

U.S. PATENT DOCUMENTS

| | | |
|---|---|---|
| 2,683,227 | 7/1954 | Beckwith . |
| 2,742,582 | 4/1956 | Bahn et al. ............................ 310/52 |
| 2,742,583 | 4/1956 | Beckwith . |
| 3,150,276 | 9/1964 | Moyer ................................... 310/54 |
| 3,155,856 | 11/1964 | Macha et al. . |
| 3,359,359 | 12/1967 | Beck et al. ............................ 174/51 |
| 3,648,085 | 3/1972 | Fujii . |
| 3,733,503 | 5/1973 | Potter ................................... 310/54 |
| 3,743,867 | 7/1973 | Smith, Jr. . |
| 4,140,934 | 2/1979 | Jäger et al. . |
| 4,317,952 | 3/1982 | Armor et al. ......................... 310/54 |
| 4,436,950 | 3/1984 | Gaffal et al. ......................... 174/18 |

Primary Examiner—Patrick R. Salce
Assistant Examiner—D. L. Rebsch
Attorney, Agent, or Firm—Wood, Dalton, Phillips, Mason & Rowe

[57] ABSTRACT

A terminal assembly (10) for a gas-filled, oil-cooled generator (14). The generator housing (12) includes an annular opening (18) with an annular boss (20) projecting into the housing (12), and sprayed coolant oil around the housing boss (20). A terminal insulator (26) is supported ion the boss (20), and a conducting lead (34) extends through an opening (32) in the terminal insulator (26). O-rings (40,42) seal the insulator (26) with both the boss (20) and the conducting lead (34). The lead (34) is resistance brazed to the end turn (56) of the generator stator.

11 Claims, 1 Drawing Figure

GENERATOR HIGH TEMPERATURE ELECTRICAL LEAD ASSEMBLYcl DESCRIPTION

1. Technical Field

The present invention relates to generators and more particularly to a sealed electrical lead assembly allowing the transmission of electrical power from a sealed generator operating under extreme environmental conditions.

2. Background of the Invention

Generators are, of course, widely used in aircrafts to generate the electrical power required in the many systems on board the aircraft. Such generators are naturally subjected to extreme environmental conditions. For example, in high performance aircraft, the generator will be subjected to ambient pressure altitudes from −1000 to 80,000 feet and to ambient temperatures from −65° F. to 700° F. In order to maintain proper conditions within the generator, it is therefore frequently necessary to provide a sealed generator housing allowing for retention of the gas provided in the generator (i.e., nitrogen is provided to keep moisture out of the generator and to provide a positive pressure to enhance oil scavenge), and such seal is also necessary in order to allow for proper circulation of cooling and lubricating oil without leakage.

The requirement of providing a secure generator housing is, however, in conflict with the need to connect the electrical energy gnerated within the housing to the various systems located elsewhere on the aircraft. Further, in view of the heat conducting capability of the leads (conventionally copper with silver plate) used to deliver power externally of the housing, it is difficult to keep seals at the lead-housing interface from suffering thermal degradation.

The prior art has recognized this probelm and U.S. Pat. Nos. 2,683,227 and 2,742,583 disclose schemes for gas jet cooling terminals. Similarly, U.S. Pat. No. 4,140,934 discloses liquid cooled terminals. Further, U.S. Pat. No. 4,317,952 shows yet another structure for cooling a terminal box. However, while providing cooling, these structures can present problems with leakage through the terminal assemblies.

U.S. Pat. No. 3,684,085 incidentally shows a terminal assembly which is sealed against leakage by an O-ring at the interface of the generator housing and the terminal lead. However, this assembly is subjected to extreme heat which could deteriorate the O-ring and accordingly destroy the desired seal.

The present invention is directed toward overcoming one or more of the problems as set forth above.

SUMMARY OF THE INVENTION

In one aspect of the present invention, a terminal assembly is provided for a gas-filled, oil-cooled generator. The generator housing includes an annular opening with an annular boss projecting into the housing. Means are provided for supplying coolant oil around the housing boss. A terminal insulator is supported in the boss, and a conducting lead extends through an opening in the terminal insulator. O-rings are provided to seal the insulator with both the boss and the conductor.

In another aspect of the present invention, the lead is resistance brazed to the end turn of the generator stator.

It is an object of the present invention to provide a generator with terminal assemblies with good electrical and mechanical properties, which assemblies are suitably cooled and sealed against leakage therethrough.

Another object of the present invention is to provide a terminal assembly which introduces minimal corrosive elements to the interior of the generator. Still another object of the present invention is provide a terminal assembly which is easy to install during assembly of the generator. Yet another object of the present invention is to provide a secure seal about the terminal lead assembly, which seal is subject to minimal deterioration under extreme environmental conditions.

DESCRIPTION OF THE DRAWING

The FIGURE is a fragmentary cross-sectional view of a portion of a generator illustrating the present invention.

BEST MODE FOR CARRYING OUT THE INVENTION

Figure 1:
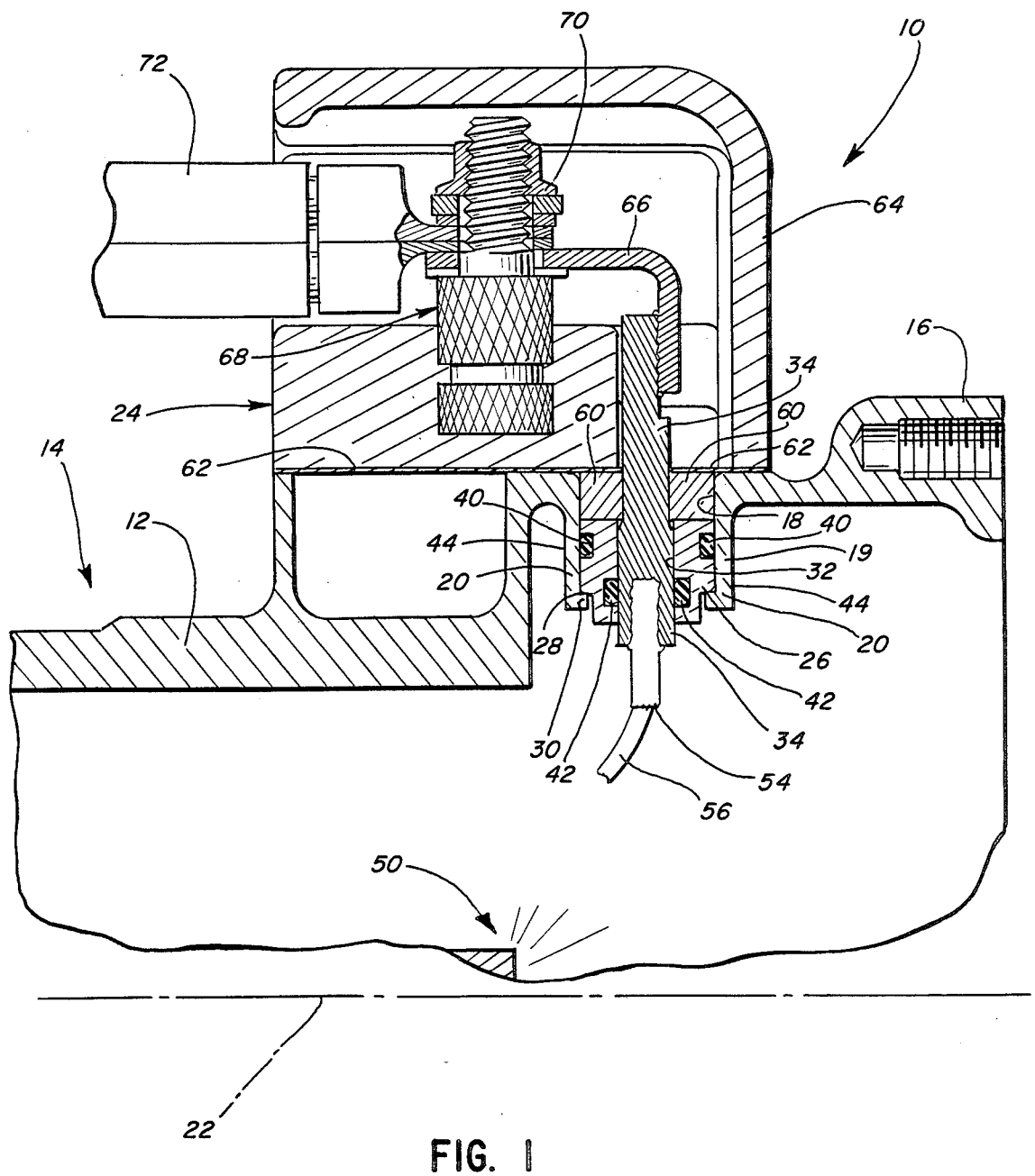

The terminal assembly 10 of the present invention is shown in the FIGURE mounted to the housing 12 of a generator 14 adjacent to a flange 16 intended for mounting on a constant speed drive (not shown). As will become apparent to a skilled artisan, this terminal assembly 10 could be used to output the generated signal in virtually any generator subjected to extreme environmental conditions.

However, for purposes of illustration, one such generator with which this assembly is particularly useful will be described here, namely a 400 hz. three-phase synchronous generator with a permanent magnet generator (PMG), an exciter and a main generator. This generator is specifically designed to operate in high performance aircraft, which in turn requires tha the generator operate in ambient pressure altitudes from −1000 to 80,000 feet and to ambient temperatures from −65° F. to 700° F.

Though the generator components are not illustrated in the FIGURE, those components and their operation may be regarded as conventional for purposes of the present invention. They will be briefly described here in order to provide an understanding of the general working of one generator with which this terminal assembly 10 is useful.

Specifically, the PMG, exciter and main generator all have rotors which are rotated by a single drive shaft. The PMG rotor is a permanent magnet which, when rotated, creates a three phase current in the PMG stator winding. The current in the PMG stator winding is rectified in a generator control unit external of the generator and that current is sent to the exciter stator. The exciter stator in turn creates a magnetic field which generates a current, typically three-phase AC, in the exciter rotor. The exciter rotor current is rectified and sent to the maing enerator rotor, thereby creating a rotating magnetic field which induces a greatly magnified output current in the main generator stator, this current being the output electric power to which the terminal assembly 10 of the present invention is connected. Various passages and oil coolant jets are provided within the generator and its housing for lubrication and to cool the generator from the heat radiated from the aircraft skin (the aircraft skin heats to extreme temperatures due to air friction at high Mach levels). Further, the generator housing is filled with an appropriate gas such as nitrogen in order to keep undesirable moisture out of the generator.

The terminal assembly 10 of the present invention extends through an opening 18 in the housing 12, which opening 18 is in a cylindrical box 20 projecting radially inwardly toward the center line 22 of the generator 14. The terminal assembly 10 operates to reliably transmit the electric power from the main generator stator (not shown) through the housing 12 to a terminal block 24 mounted on the generator's exterior.

A terminal insulator 26 is disposed within the opening 18 and includes a shoulder 28 which rests against a flange 30 about the inner end of the boss 20. The terminal insulator 26 further includes an opening 32 through its center through which an electrical lead 34 extends. The lead 34 is preferably made of nickel alloy which (particularly when compared to copper) has both good electrical properties and good mechanical strength at the elevated temperatures of the environment (e.g., the generator 14 may operate at 250° F. at an 80,000 foot altitude in a surrounding temperature of 700° F.).

Sealing about the terminal insulator 26 is provided by O-rings 40,42, one between the terminal insulator 26 and the boss 20 and the other between the terminal insulator 26 and the lead 34.

It is important that the O-rings 40,42 be kept cooler than the high ambient temperatures in the surrounding environment in order to prevent degrading of the O-rings 40,42 and to ensure retention of their mechanical ability to seal against leakage of either nitrogen or oil from the housing 12. The structure of the box 20, as well as other insulating features described further below, protects the O-rings 40,42 and terminal insulator 26 against these high ambient temperatures.

Specifically with regard to the boss 20, its disposition in the housing 12 results in its exterior surface 44 surrounding the O-rings 40,42 and terminal insulator 26 being exposed so that coolant oil may be provided thereon. The FIGURE has indicated this oil supply schematically at reference no. 50, the oil typically being flung into the area of the boss 20 (as well as all other areas) by the rotational forces in the generator. Further, the boss 20 serves to space the O-rings 40,42 and terminal insulator 26 from the outer diameter of the housing 12 (which is at the elevated temperature of the environment surrounding the generator 14).

Further, by disposing the O-rings 40,42 with the O-ring 42 about the lead 34 closer to the generator center line 22 than the other O-ring 40, cooling of both O-rings 40,42 is maximized. That is, the O-ring 42 spaced farthest from the boss exterior surface 44 is compensated in cooling by being located closest to the cooled inner end of the insulator 26.

Prior to its assembly in the generator 14, the electrical lead 34 is brazed to a lead stub 54 made of cooper.

The lead stub 54 and a stator end turn winding 56 (also of copper) are resistance brazed. The copper lead stub 54 thus allows for a copper-to-copper resistance brazing, which is desirable. Further, since the lead stub 54 and the stator winding 56 must be connected in situ (i.e., within the generator housing 12) during assembly, resistance brazing allows the desired connection to be made without the use of flux. Accordingly, there is no corrosive residue as would unavoidably be left in the housing 12 if the flux required for conventional brazing were used in making this connection.

A split washer type insulator 60 is also disposed in the housing opening 18 and around the electrical lead 34. This high temperature insulator 60 functions as a thermal barrier to protect the terminal insulator 26 and its associated O-rings 40,42 from the often high ambient temperatures of the surrounding environment.

The terminal block 24 is disposed on a gasket 62 and secured to the housing 12 at the location where the electrical lead 34 exits the housing 12. A cover 64 is similarly provided thereon to protect the terminal assembly 10. The block 24, gasket 62, and cover 64 are all high temperature insulating components which further serve to protect the terminal insulator 26, O-rings 40,42 and electrical lead 34 from high ambient temperatues.

A terminal strap 66 (also made of nickel alloy) is brazed to the external end of the electrical lead 34 (this can be accomplished prior to assembly). The strap 66 engages a threaded fastener 68 having a knurled head cast in the terminal block 24. A nut 70 on the fastener 68 may be used to secure the strap 66 to back-to-back leads 72 adapted to carry the generated electric power to the aircraft components requiring that power.

It should be understood that although only one electrical lead 34 is shown in the FIGURE, four such leads could be provided through four openings through four adjacent terminal insulators for the three-phase, four wire wye connected, electric power produced by generators such as previously described.

Accordingly, the terminal assembly 10 has good electrical and mechanical properties despite the extreme environmental conditions to which it is subjected. The assembly 10 provides a lead which extends through the housing 12 while being insulated therefrom, and further provides a seal against leakage of gas or coolant oil therethrough. The seal is still further configured so as to minimize any degrading thereof as a result of the extreme environmental conditions, and thereby provides a reliable operation. Still further, this terminal assembly 10 is easily installed during assembly of the generator 14.

Other aspects, objects, and advantages of the present invention can be obtained from a study of the drawings, the disclosure and the appended claims.

I claim:

1. A terminal assembly for connecting a stator signal to the exterior of the housing of a gas-filled, oil-cooled generator, comprising:

a terminal insulator extending through an opening in the generator housing, said insulator having an opening therethrough and said housing opening further extending through a boss projecting into the housing;

means for supplying coolant around said boss;

a first O-ring providing a seal between the insulator and the boss;

a conductor extending through the terminal insulator opening and being connected to the generator stator; and a second O-ring providing a seal between the conductor and the insulator within the portion of the opening located within said boss.

2. The assembly of claim 1, wherein the second O-ring is disposed nearer the generator center than the first O-ring.

3. The assembly of claim 1, wherein said conductor includes a nickel alloy lead secured to a copper lead connected to the generator stator.

4. The assembly of claim 3 wherein the copper lead is resistance brazed to the generator stator.

5. The assembly of claim 1, further comprising an external terminal connecting the conductor to selected components requiring power.

6. The assembly of claim 1, wherein each stator winding is provided with a separate conductor.

7. The assembly of claim 1, further comprising a thermal barrier insulator disposed within said housing opening, said barrier insulator being about said conductor and adjacent said terminal insulator, wherein said terminal insulator is disposed only within the portion of the opening located within said boss.

8. In a gas-filled, oil-cooled generator having a housing and generting an output signal, a terminal assembly comprising:

a boss projecting into said housing and having an opening aligned with an opening through the housing;

means for supplying collant around said boss;

a terminal insulator supported in said boss within said boss opening, said insulator having an opening therethrough;

a conducting lead extending through said insulator opening;

a first O-ring sealing the insulator with the boss; and a second O-rng sealing the insulator with the conductor, said second O-ring being disposed within the boss opening.

9. The assembly of claim 8, wherein said conducting lead includes a nickel alloy lead secured to a copper lead connected to the generated output signal.

10. The assembly of claim 9, wherein the output signal is generated in a stator and the copper lead is resistance brazed to the generator stator.

11. The assembly of claim 8, further comprising a thermal barrier insulator disposed within said housing opening, said barrier insulator being about said conducting lead and adjacent said terminal insualtor, wherein said terminal insulator is disposed only within the innermost portion of the housing opening in said boss.

* * * * *